United States Patent [19]

Lee

[11] Patent Number: 4,953,135

[45] Date of Patent: Aug. 28, 1990

[54] DRY BLENDING WITH FIBERS

[75] Inventor: Donald M. Lee, Huntington, W. Va.

[73] Assignee: Ashland Oil, Inc., Ashland, Ky.

[21] Appl. No.: 297,280

[22] PCT Filed: Feb. 6, 1987

[86] PCT No.: PCT/US87/00287

§ 371 Date: Aug. 17, 1988

§ 102(e) Date: Aug. 17, 1988

[87] PCT Pub. No.: WO87/04972

PCT Pub. Date: Aug. 27, 1987

Related U.S. Application Data

[63] Continuation-in-part of Ser. No. 831,240, Feb. 19, 1986, Pat. No. 4,669,887.

[51] Int. Cl.[5] .............................................. B01F 15/02

[52] U.S. Cl. ...................................... 366/155; 366/30; 366/76; 366/165; 366/290; 366/292

[58] Field of Search ................. 366/21, 30, 76, 13-15, 366/150, 101, 154, 102, 155, 160, 165, 162, 182, 292, 290, 291, 318, 325; 241/101 B; 523/157, 159; 188/78, 250 A, 251 A

[56] References Cited

U.S. PATENT DOCUMENTS

| | | | |
|---|---|---|---|
| 1,960,030 | 5/1934 | Sackett | 259/9 |
| 2,428,298 | 9/1947 | Spokes et al. . | |
| 2,685,551 | 8/1954 | Spokes | 154/140 |
| 3,007,549 | 11/1961 | Klein | 188/78 |
| 3,007,890 | 11/1961 | Twiss et al. | 260/38 |
| 3,150,215 | 9/1964 | Houghton | 264/115 |
| 3,314,398 | 4/1967 | Legourd | 119/71 |
| 4,242,841 | 1/1981 | Ushakor et al. | 51/263 |
| 4,427,645 | 1/1984 | Frenken et al. | 423/658.5 |
| 4,501,047 | 2/1985 | Wrassman | 19/85 |
| 4,514,093 | 4/1985 | Coch et al. | 366/138 |
| 4,669,887 | 6/1987 | Lee | 366/155 |

FOREIGN PATENT DOCUMENTS

| | | | |
|---|---|---|---|
| 2619810 | 11/1977 | Fed. Rep. of Germany | 366/160 |

*Primary Examiner*—Timothy F. Simone
*Attorney, Agent, or Firm*—Richard C. Willson, Jr.; Stanley M. Welsh

[57] ABSTRACT

Disclosed is a method and apparatus for avoiding the clumping of dry fibers having diameters and lengths in certain ranges during blending of such fibers into a dry or wet particulate material. The process comprises distributing fibers in a vaporous medium, and transporting fluidized fibers to a mixing zone containing a dry or wet particulate material. Concurrently with stirring and blending of the particulate material with fluidized fibers, the fluidized fibers having been separated at least partially from a fluidized vapor are gradually introduced into the mixing zone. This process avoids the phenomena of "balling" that otherwise occurs with certain fibers.

40 Claims, 7 Drawing Sheets

'A-A'

'B-B'

'A-A'

'B-B'

DRY BLENDING WITH FIBERS

CROSS REFERENCE TO RELATED APPLICATIONS

This is a continuation-in-part of U.S. application Ser. No. 831,240, filed Feb. 19, 1986, now U.S. Pat. No. 4,669,887.

BACKGROUND OF THE INVENTION

The field of this invention relates to compounding of fibrous components in a binder matrix. More specifically, this invention relates to the use of carbon fibers in particulate binder matrices.

PRIOR ART

Brake pads are conventionally made by resin reinforced materials and then machined into appropriate shapes. Examples of appropriate resins that are used in brake pads are phenolic resins. Necessary attributes of brake pads are their ability to withstand mechanical compression, maintain their shape, withstand high temperatures, and distribute friction uniformly.

Currently, the fibrous reinforcement for brake pads is usually provided by asbestos. However, in light of asbestos' hazards and the need for work place safety for employees, substitutes for asbestos are in demand. Primary characteristics that make asbestos a useful fibrous reinforcement material in brake pads are its high temperature, performance, high strength and light weight.

It is these same characteristics that make carbon fiber a particularly attractive partial substitute. Unfortunately, the carbon fibers which produce the best results tend to be those which are most uniform in terms of diameter and length. This is unfortunate because it is precisely the uniformity of length and diameter which tends to result in a phenomena which for purposes for this specification will be referred to as the "balling tendency".

In a mix of dry fibrous carbon fibers, there is a tendency for the carbon fibers to clump together in spheroidal particles. These particles are made up of clumped and intertwined discrete carbon fibers. Once carbon fibers have formed tightly agglomerated closely interacting bundles of carbon fibers, they do not uniformly distribute throughout a dry binder matrix during stirring.

European patent application, having publication No. 0125511 and application No. 84104229.4 with a date of filing Apr. 13, 1984, entitled "Carbon Fiber—Reinforced Gypsum Models and Forming Molds, Gypsum Powdered Materials for Making Such Models and Molds, and a Method for Producing Them", discloses usefulness of carbon fibers as reinforcement materials. Also disclosed is the fact that carbon fibers are apt to form lumps. To insure uniform dispersion of carbon fibers having lengths ranging from 5 to 100 mm, prior to addition to a gypsum slurry, bundles of carbon fibers are separated into single fibers by dispersing them in water with supersonic agitation. Once the carbon fibers have been uniformly dispersed in a gypsum slurry, they will tend to remain separated provided the ratio of amount of the carbon fibers to gypsum is very small.

The following patents are examples of technology relating to friction elements of the type which are often employed in brakes of automotive vehicles. U.S. Pat. No. 2,428,298 of R. E. Spokes et al. entitled "Friction Element", discloses use of finely divided dust-like materials composed essentially of vulcanizable synthetic rubber-like elastoprenes of the butadiene-acrylonitrile copolymer type compounded with about 5% to about 10%, by weight, of sulfur. These materials provide useful friction-controlling or friction-stabilizing agents in friction elements.

U.S. Pat. No. 3,007,890 of S. B. Twiss et al., entitled "Friction Elements and Method of Making Same", discloses the use of high molecular weight, high acrylonitrile content, butadiene-acrylonitrile copolymer, synthetic rubber-like elastoprenes give superior stable friction elements with a high level of friction coefficient at high temperatures in over a wide range of temperatures.

U.S. Pat. No. 3,007,549 of B. W. Kline, entitled "Friction Controlling Means", discloses a multi component, friction producing device.

U.S. Pat. No. 2,685,551 of R. E. Spokes, entitled "Friction Elements and Methods of Making Same", discloses friction elements employing synthetic rubber is the principal ingredient in the bonding agent. Bonding agents commonly comprise thermosetting resins and/or a synthetic rubber.

It has been observed that carbon fibers that have undergone the balling phenomena will not permit a resin to uniformly distributed throughout the ball. When these materials are on a machined surface of a brake pad, they form high friction scratchy zones that play havoc with a brake disc. Optimum wear properties and optimum performance properties occur when very uniform fibers in terms of both length and diameter are fully and uniformly dispersed throughout the brake pad in such a manner so as to avoid surface discontinuities such as described above.

Wrassman fiber processor employes a high speed agitator to dissect or exfoliate clumps or bundles of fiber prior to introducing it into a vaporous fluid. Employing a high speed agitator in this way is very energy intensive and, as production rates rise, its effectiveness tends to fall off dramatically. In addition, use of high sheer on fibers tends to cause a great deal of attrition and wear on the fibers limiting the size of the fibers that may usefully be employed with a high sheer agitator. Wrassman causes fibers to be separated as a result of direct contact with blades rotating at a rate of from 5000 to 9000 feet per minute which blades have one or more pick-like points. A differential pressure to induce flow and in part to separate fiber agglomerates of at least forty inches (40") of water is required.

Accordingly, it is an object of this invention to find a way to blend dry carbon fibers into a dry or wet resin matrix so as to avoid the "balling phenomena" and capitalize to the extent possible on the benefits that are otherwise available from having fibers of uniform diameters and lengths.

Other objects of this invention will be clear to one skilled in the art based upon the teachings herein disclosed.

BRIEF DESCRIPTION OF THE INVENTION

This invention is primarily concerned with uniform fibers having diameters preferably in the range of about 5 microns to about 30 microns and lengths preferably in the range of about 350 microns to about 600 microns. The optimum lengths for fibers in brake pads are generally in the range of about 400 microns to about ½ inch and diameters, 5 to 20 microns.

This invention, however, has broader applications in terms of distributing any fiber which has a tendency to undergo a balling phenomena when introduced as a dry material directly into a blender containing dry or wet matrix material. For example, fiber having a diameter in the range of about 5 to 30 microns and lengths from 50 microns to a ½ inch can be easily handled in the method and apparatus of this invention.

Essentially, this invention is directed to the observation that if fibers are first fluidized in a vaporous fluid, e.g. air, so that they are essentially a random mix of loosely as opposed to closely interacting discrete carbon fibers, such a fluidized distribution can be uniformly added to a blender containing a wet or dry matrix material while such blender is in operation so as to result in a uniform distribution of the carbon fibers throughout the matrix material which substantially, if not totally, eliminates the phenomena of clumping into spheres, i.e. the "balling phenomenon".

More specifically, we have found that a differential pressure, as measured in inches of water as a pressure head, of at least about 10 inches, and preferably at least about 20 inches and still more preferably at least about 30 inches composed of fibers and vapors results in the entraining of such fibers in such vapors to form a fiber-entrained-vapor-mixture of an entrained-fiber and a vapor-stream. The mixture is transferable as a fluid under the force of a differential pressure in inches of water in the range of about 10 to 35 inches, and preferably 20 to 30 inches. Greater differential pressures are possible, however attrition of fibers can become a very undesirable consequence of too much difference in pressure. Also mechanical energy, wear, and cost limit the desirability of too high a pressure differential.

The optimum differential pressure varies with the ratio by volume of fiber to vapor. Clearly as the ratio increases, a higher differential pressure will usually be required. There is also a need for turbulence to break-up and then adequately entrain the fiber in the vapor or fluid medium carrier.

Ratios by volume of vapor to fiber in the range of about 1,300:1 to about 20,000:1, and preferably 1,500:1 to 5,000:1 have been found suitable. If the ratio by volume of fiber: vapor becomes too high, then the mixture of entrained fiber in vapor becomes very difficult to fluidize and transport in a conduit. On the other head, if the ratio is too low, e.g. excess volume of vapor over fiber, efficiently separating fiber from vapor, as discussed with respect to later processing steps of this invention, can become a practical limitation on the usefulness of the invention.

Another factor, bulk density of the fiber which is to be introduced into and entrained within a vaporous medium, e.g. air determines the ratio by volume of fiber to vapor. A bulk density of fiber, e.g. carbon fibers or other synthetic or natural fiber, in the range of about 1 pound per cubic foot to 35 pounds per cubic foot, preferably 5 to 20 pounds per cubic foot, and still more preferably 7 to 15 pounds per cubic foot have been found suitable. If the bulk density becomes too high, e.g. substantially greater than 35 pounds per cubic foot as a result of vibration or compression, then the fibers can become so entangled that even passing them through a substantial pressure differential that is turbulent can neither sufficiently entrain the fibers in a vapor for transferability as a fluid nor avoid very deleterious attrition to the fibers.

Broadly, we have found four methods for producing a mixture of fibers and particulates without first wetting the fibers prior to addition to the particulates. In one, fibers are entrained in a vapor medium or carrier, e.g. air, and then particulates are added to the stream. In another, particulates are at least partially added to the vapor carrier stream followed by the addition of fibers. In still another, fiber and particulates are at least in part entrained together by separate or joint streams of particulates and fibers into a vapor carrier stream. In general, entrained fibers in a vapor, which can contain some particulates, are separated at least in part from said vapor to form separated fibers which are then mixed with dry or wet particulates in a storage zone, wherein the rate of addition of separated fibers to the storage zone and mixing are coordinated to avoid formation of fiber agglomerates.

Of significance, we have discovered that when particulates of a sufficiently small equivalent spherical diameter are present with fiber entrained in a vapor carrier, that the particulates at least in part coat the fiber. Once coated, fibers appear to have a lessened tendency to agglomerate and form clumps. An example of a particulate which in sufficient quantities has been found especially to reduce the tendency of fibers to clump is carbon black. Carbon black up to about 5% by weight, and preferably up to 2% by weight as based upon the total weight of fiber and particulate, has been found especially advantageous. Larger quantities above about 5% by weight do not provide a significant decrease in agglomeration over the added expense of using additional carbon black, although larger quantities can be used.

Carbon black suitable for this invention has the following described characteristics. It is preferably produced in a refractory-lined furnace reactor by pyrolysis of highly aromatic refinery by-product oils. These oils are subjected to high temperature of about 1,400° to 1,650° C. in a reaction zone maintained to conditions producing an endothermic reaction which strips aromatic hydrogen from the aromatic hydrocarbon molecules to leave aromatic nuclei. The resulting reticulated particles in the form of black "smoke" are quenched in a downstream tunnel by water injection at a point several feet from the reaction zone. In this method of manufacturing carbon black, the primary particle size can be closely controlled and produced particle diameters in the range of about 200 to 900 Angstroms. These primary particles are simultaneously bound together to form primary reticulated chains having lengths in the range of about 500 to 30,000 Angstroms.

Preferably, fibers in a vapor with or without particulates are passed through a differential pressure that is turbulent enough to both entrain the fibers, break-up any agglomerates to ensure uniformity of distribution of individual fibers throughout the vapor carrier, and provide a sufficient impetus or force to induce flow through a conduit of the entrained-fiber-vapor stream without blockage, e.g. due to settling.

In all of the methods, presence optionally of a recycle to transfer at least a portion of vapor separated from streams containing fiber with or without particulates entrained in a vapor carrier has been found very useful and beneficial. The recycle can employ a means for fluid transfer, such as a conduit with or without a separate means for inducing flow therein. The simplest recycle provides fluid connection or communication to combine one stream into that of another. For example, the stream that is separated, e.g. ballistically or cyclonically, from a stream comprising solids entrained in a vapor, and that consists primarily of vapors, e.g. containing no more than 5%, and preferably no more than 2% by weight of solids, as based on the total weight of the stream, can be at least in part recycled as a recycle stream by fluid connection between itself and one or more vapor carrier streams or particulate-containing streams.

Broadly, there can be four types of vapor carrier streams: one consisting of vapor having less than 0.1% by weight of solids therein, as based on the total weight of stream including solids, such as air; one comprising vapor and fiber; one comprising vapor and particulates; and finally, one comprising vapor, fiber, and particulates. The general ratio by volume of vapor:solids (wherein the solids comprise fibers, particulates, or both) is in the range 1,300:1 to 20,000:1, and preferably 1,500:1 to 5,000:1, and most preferably 1,800:1 to 3,000:1. An entrained fiber and particulate containing stream can have from 10% by weight to 50% by weight, and preferably 30% by weight to 45% by weight of solids, as based upon the total weight of both solids and vapors in the stream.

Throughout the specification and the claims, the following definitions are used. "Fluid communication" or "fluid connection" is intended to mean such a connection, for example, by conduits, between at least two identified locations, so that a substantial portion, e.g. more than 50% by volume of the total volume thereof of a fluid, such as entrained fibers or particulates in a vapor or other fluid medium, will flow from one such location to the other as a result of a difference in pressure therebetween. A "fluid" is any material which under the influence of a differential pressure flows like a liquid or gas.

More specifically the fibers fluidized in the vaporous medium have a ratio by volume of fiber to fluid which must not be so high as to preclude transfer, e.g. by blockage, in a conduit when under a differential pressure in inches of water as a pressure head of at least 10, and preferably at least 20 and generally, when in the range of 10 to 35. Appropriate sizes for such conduits tends to have inside diameters in the range of about one to four inches.

When the fibers have diameters in the range of about 5 microns to about 30 microns and lengths in the range of about 50 microns to about ½ inch, the clumping into spheres tends to give rise to spherical particles having diameters in the range of about ⅛" to about ½".

DETAILED DESCRIPTION OF THE INVENTION

Brief Description of the Drawings

FIG. 1 discloses a fiber fluidizer 10, a mixer 12, and a separator 14. In more detail, the fiber fluidizer 10 comprises a feed hopper 16, storage zone 18, a motor 20, drive shaft 22, bar or rod stirrer 24, double rod stirrer 26, bearing 27, exit chute 28, conduit 30, conduit connection 32, impeller fan 34, and conduit 38. Separator 14 comprises inlet 40, housing 41, vapor outlet 42, solids outlet 44, bag filter 46, filter zone housing 57, and conduit 48 to a low pressure zone (not shown). Mixer 12 comprises an inlet 44, blend outlet 45, a mixing zone 49, a primary motor 59, a secondary motor 60, a secondary stirrer 62, shaft 64, bearing 66, and primary stirrer blades 65.

Figures 1, 4:
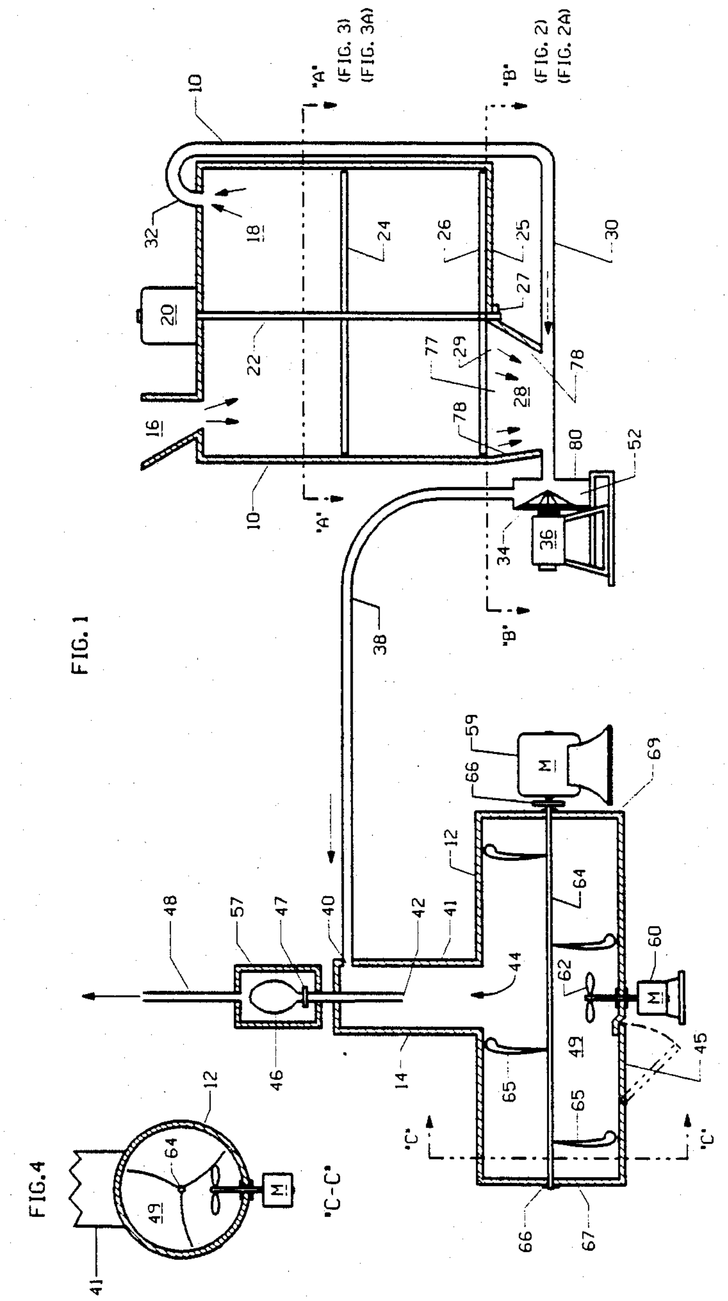
FIG. 1 is a side elevation view partially in cross-section disclosing a fluidizing fiber feed system to a dry mixer.
FIG. 4 is a side elevation view along line C—C of FIG. 1.
Figure 3:
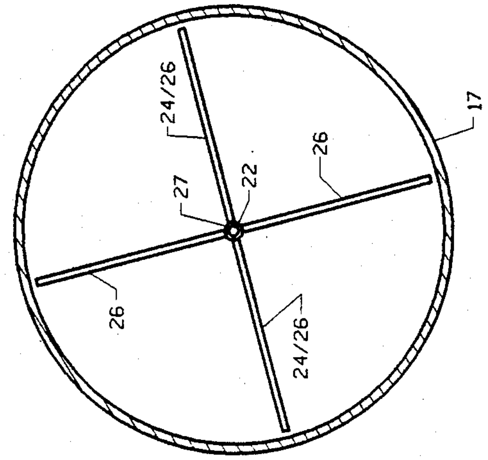
FIG. 3 is a top plan view along line A—A of FIG. 1.

Briefly, operation of the system disclosed in FIG. 1 is as follows. Carbon fibers are introduced into feed hopper 16 and drop into fiber storage zone 18. Motor 20 by moving, e.g. rotating, drive shaft 22 maintains the carbon fibers in an easily flowing state as a result of rod 24. It is to be noted that in most operating circumstances rod 24 is not critical and the apparatus can be run with or without rod 24. Fibers, such as carbon fibers, rest on bottom 25 of storage zone 18. Rod 26 shown in top plan view in FIGS. 2 and 3 is sufficiently close to the bottom 25 so as to permit sufficient clearance to induce the fibers to move around until they are in alignment with exit chute 28 which has a pie shaped opening 29.

Figure 2:
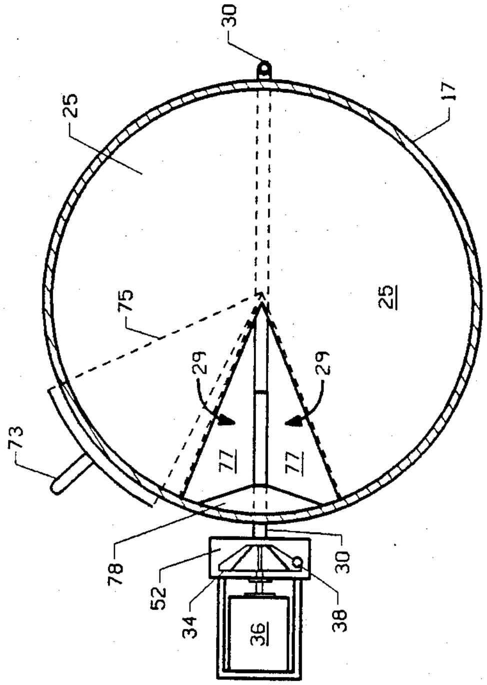
FIG. 2 is a top plan view along line B—B of FIG. 1.
Figure 3A:
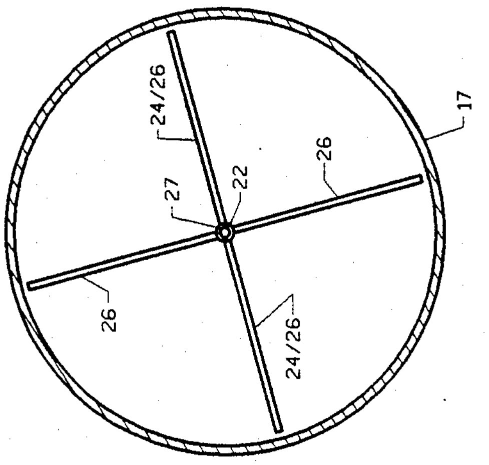
FIG. 3A is an alternative top plan view along line A—A of FIG. 5.
Figure 2A:
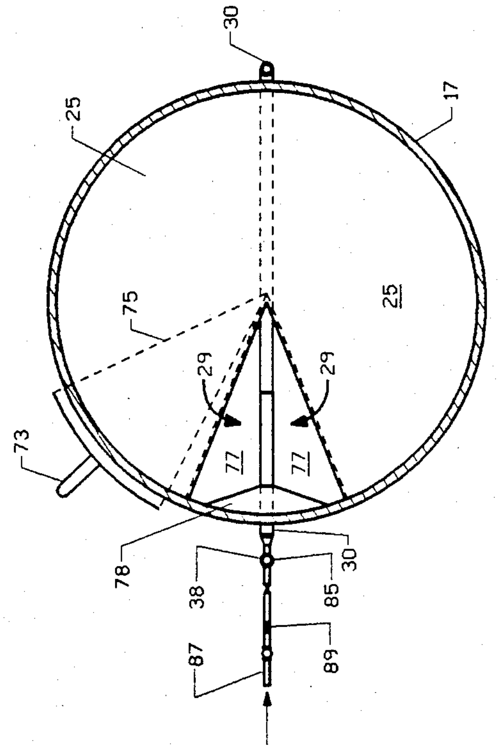
FIG. 2A is an alternative top plan view along line B—B of FIG. 5.

The adjustable pie shaped opening 29 through valve wedge or plate 75 shown in FIG. 2 is adjustable by moving valve wedge 75 with slide pull 73 to give an angle generally in the range of 5° to 90°. If the pie shaped opening is too open then the conduit plugs. Chute walls 77 and 78 provide a pathway into the interior of conduit 30 that leads to motor housing 80. If the pie shaped opening 29 is too small then an insufficient number of fibers fall through. The clearance between rod 26 and bottom 25 has been found in practice to be preferably in the range of about ¼ inch to ½ inch when the size of the carbon fibers are in length from 50 microns to ½ inch and in diameter from 5 to 30 microns. In practice, a useful clearance is about ⅜" for fibers having a median in length from 250 to 550 microns and in diameter from 5 to 30 microns. Rotational rate of rod 26 is in the range of about 1 to 100 revolutions per minute. With decreasing rotational speed, there is a slowing in fiber flow through opening 29.

Fibers passing through pie shaped opening 29 into exit chute 28 enter conduit 30 and are drawn by impeller fan 34 to move through the impeller blades 34 and impeller zone 52 into conduit 38. Impeller blades 34 move due to rotational torque supplied by motor 36.

At the top of fiber fluidizer 10, there is a conduit connection 32 which in a fluid tight connection insures flow of entrained fibers near the top of storage zone 18 to enter into conduit 30 without escaping into the environment. Flow into conduit 30 arises due to lower pressure in conduit 30 as compared to that in storage zone 18.

The fluidized medium, e.g. air containing entrained fibers, moves through conduit 38 into inlet 40 of separator 14 at a fluid flow rate sufficient to maintain a homogenous mixture of air and fiber; e.g. wherein the fiber does not settle out or cause blockage within conduit 38. We have found that fluid flow rates for a mixture of fibers such as described in this specification in the range of about 1,000 to about 6,000 or more feet per minute work satisfactorily.

A means for producing a fiber entrained vaporous stream flowing in a conduit with a speed in the range of 1000 feet per minute to about 6000 feet per minute and for producing a pressure differential in said conduit in the range of 10 to 35 inches of water as a pressure head, preferably 20 to 30 inches of water as a pressure head. An example of a piece of equipment which can produce such a speed of flow and such a pressure drop is a 1.2 horse power blower motor sold by Breuer Electric of Chicago, Ill. In the case of such a 1.2 horse power blower, the differential in pressure is measured between the suction port and the discharge port of the fan. Generally, any impeller either open or closed can be used. However, an open impeller is preferred because it has a smaller tendency to become clogged with fibers suitable for the instant invention.

Separator 14 is basically a cyclone which uses acceleration toward walls 41 to separate fibers from vapors or fluid medium. The fluid medium entering through inlet 40 is induced to swirl causing the fibers to be moved toward housing or walls 41 and then down through solids outlet 44 into mixing zone 49 of mixer 12. Vapors which have been separated from the fluid medium having entrained fibers is induced to move through vapor outlet 42. Vapors leaving through vapor outlet 42 enters a filter 46, a filtering zone housing 57 and then through a conduit 48 to a low pressure area (not shown). Bag filter or sock 46 is attached to the vapor outlet conduit by means of pinch clamp 47. The low pressure in conduit 48 can be due to a vacuum pump, for example.

Instead of having the impeller fan 34 located where it is, it is possible to have a vacuum system attached to conduit 48 to induce flow of vapors in the directions indicated by flow arrows. It is possible to have an additional motor to induce flow of vapor downstream of conduit 48 in addition to or to the exclusion of motor 36 with impeller fans 34.

Figure 5:
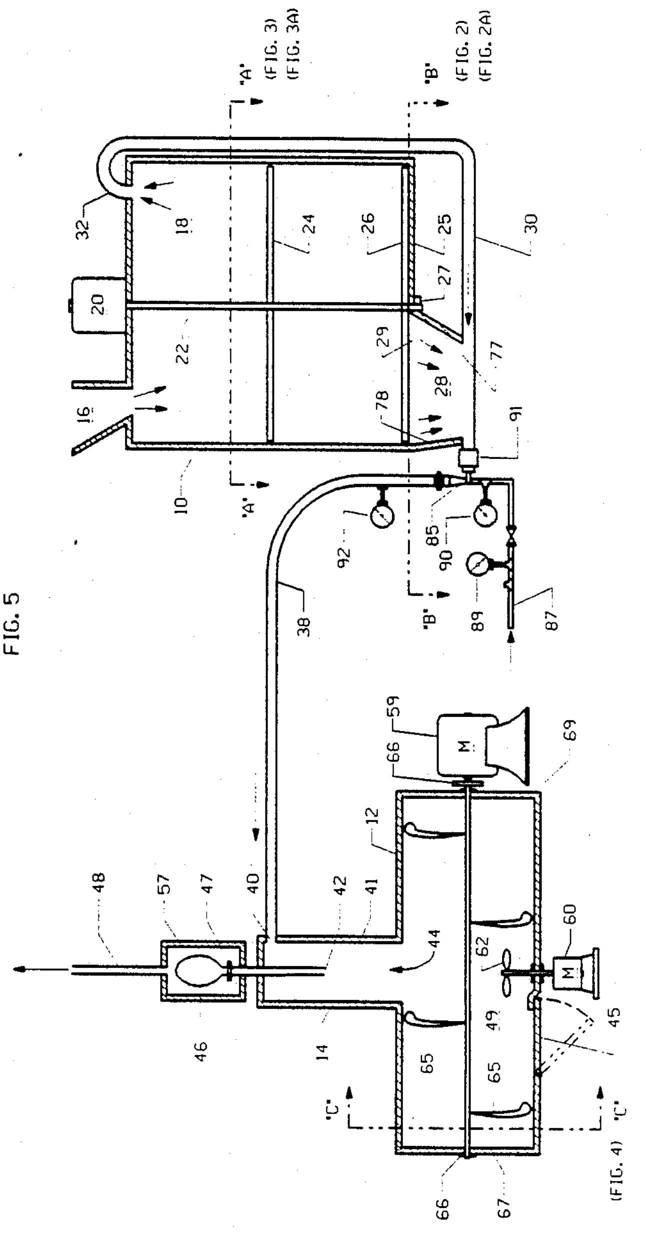
FIG. 5 is a side elevation view partially in cross-section disclosing an alternative embodiment to FIG. 1.

There is some desirability to avoid having impeller fan 34 in the location disclosed because it does cause some attrition and wear of the fibers. As an alternative to impeller motor 36 with impeller fan 34, an eductor 85 (shown in FIG. 5) may be used. In FIG. 5, corresponding elements to those shown in FIG. 1 have the same numbers. Briefly, air or other vaporous fluid, under pressure, acts as the motive force. A source (not shown) for such fluid enters conduit 87. Pressure gauges 89, 90, and 92 through valves in conduit 87 permit one to select an appropriate pressure to ensure proper flow of fluid. Fiber enters the lower pressure inlet 91 under the influence of motive stream which enters through conduit 87. The two streams combine and flow into conduit 38. For example, pressure for gauge 90 are in the range of about 5 to 20 psig, and preferably, 7 to 12 psig, and for gauge 92, about 0.75 to 3 psig, and preferably, about 1 to 2 psig.

Other examples of means of dispersing carbon fibers in a fluidizing medium including brushing through a screen or sieve or forcing through a vibrating sieve into a flowing air stream.

The blend of fibers and matrix media which has been stirred by blades 65 mounted on shaft 64 attached to primary motor 59 and pivotally mounted by bearings to ends 67 and 69 of mixer 12, in a dry state in mixing zone 49 can be removed through blend outlet 45. Dotted outline shows blend outlet open and solid lines shows blend outlet closed. Optionally, secondary motor 60 provides additional stirring.

We have found that still further benefits in processing are made possible by recycling a portion of the fluid stream separated from a fluidized mixture of vapors and entrained solids. The amount of recycle, as based on the total volume of material flowing past the chute 628, is preferably at least 10% by volume, and more preferably at least 25% by volume, and generally has a percent by volume in the range of 0 to 100%, and more preferably a percent by volume in the range of about 10 to 90% by volume. The percent by weight of solids in a recycle stream is generally less than about 5% by weight, as based on the total weight of solids in the fluidized mixture of entrained solids and vapor which enters a separation means.

Among the benefits from a recycle are a slightly higher pressure to the means for causing flow within a conduit, such as for example, a high pressure fan or eductor; a reduced pressure to the filter bag or filter sock; a portion of very fine particles are recycled and reintroduced into the fiber upstream of the means for causing flow in a conduit, thereby, providing a reduced tendency to agglomerate; and with a recycle it is possible to disperse in a plug flow fluidization stream the particulates that make up the matrix so as to avoid necessity for a Littleford mixer or other mixing system in order to introduce the fluidized fibers into a blend. Each of these advantages will be discussed in more detail with respect to FIGS. 6 and 7.

Figure 6:
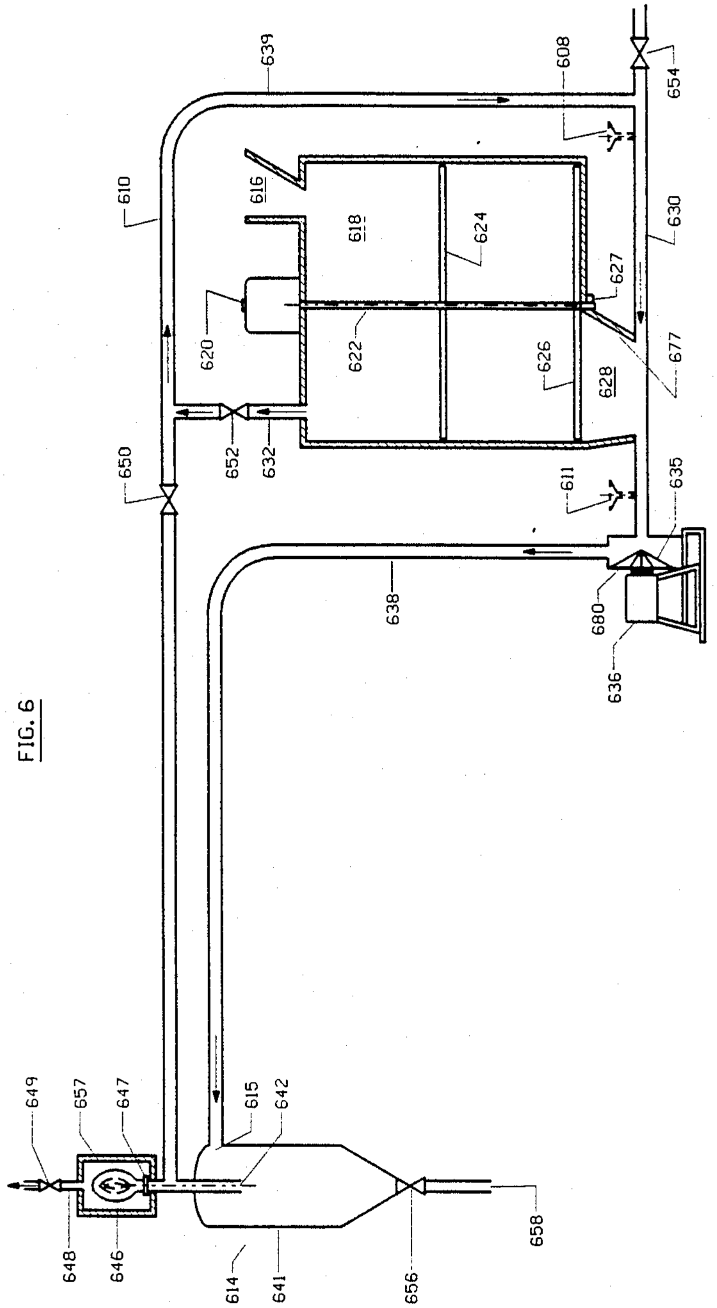
FIG. 6 is a side elevation view disclosing substantially the same device as disclosed in FIG. 1 except for providing an improved recycle system.

Referring to FIG. 6, there is shown a fiber fluidizer 610, and a separator 614. In more detail, the fiber fluidizer 610 comprises a feed hopper 616, a storage zone 618, a motor 620, a drive shaft 622, bar or rod stirrer 624, double rod stirrer 626, bearing 627, exit chute 628, conduit 630, conduit connection 632 containing a valve 652, impeller fan 635, impeller 636, conduit 638, conduit 639, particulate inlets 608 and 611 (shown in phantom outline at optional locations), valve 650 and bleed valve 654. Separation vessel 614 comprises an inlet 615, a vapor outlet 642, a vessel 641, a solids outlet 658, a filter 646, a filtering zone housing 657, a conduit 648 with a valve 649 to a low pressure area (not shown). Bag filter or sock 646 is attached to a vapor outlet conduit by means of a pinch clamp 647. Low pressure in conduit 648 can be due to a vacuum pump, for example in those situations where it is necessary as for example when valve 650 is closed.

Instead of having an impeller fan 635 located as shown in FIG. 6, it is possible to have a vacuum system attached to conduit 648 to induce flow of vapors in the directions indicated by the arrows. It is possible to have an additional motor to induce flow of vapor downstream of conduit 648 in addition to or to the exclusion of the impeller 636.

Apparatus of FIG. 6 works in substantially the same way as the one described in FIG. 1, except for the differences relating to the recycle system and matrix material inputs 608 and 611 (shown in phantom outline). The recycle system includes conduits 639, 630 and 632. In 639, there is a valve 650 which can turn off the recycle. Into conduit 630 is an optional bleed valve 654 to permit fine tuning and optimization of the fiber fluidizer system. Also, into conduit 630 are optional matrix material inputs 608 and 611 which can, for example, involve rotary valves; one, all or none of these particulate inlets may be used. However, with these matrix material inputs, it is possible to use a plug flow mixing process to disburse fibrous material into particulate matrix material without use of a separate mixing zone such as employed in FIG. 1. Optionally, matrix material may be added to conduit 638 downstream of impeller 636 and impeller fan 635. However, no such particulate feed input is shown in any of the Figures.

Briefly, operation of the apparatus in FIG. 6 is as follows. Fibrous material is introduced into hopper 616 which leads to storage zone 618. During loading of fibrous material to hopper 616, valve 652 in conduit 632 is open and valve 650 in conduit 639 is closed. To permit during loading of hopper 616 escape of pressurized gases, valve 649 in conduit 648 downstream of bag filter 646 is open.

The fiber entering storage zone 618 is permitted to fall through an opening which leads to exit chute 628 having chute walls 677 in fluid communication with the interior of conduit 630. Motor 620 turns shaft 622 mounted on a bearing 627 so that rods 624 and 626, as described in connection with FIG. 1, maintain the fibrous material in a substantially fluid and free flowing condition. The rate of rotation for shaft 622 is in the range of approximately 10 to about 50 revolutions per minute. Generally, feed rate through chute 628 can be controlled by speed of rotation, opening of hopper 616, and opening size (variable) of chute 628 so that, in general, the bulk density of fiber entering conduit 630 is in the range of about 1 pound per cubic foot to about 35 pounds per cubic foot.

Although a pie shaped opening has been found particularly advantageous, especially an adjustable pie shaped opening, any opening which will permit the free fall of fibers may be used. Essential is that the fibers fall freely and be aspirated into the stream of material flowing in conduit 630 past the opening into conduit 630 defined by chute 628.

During loading, flow of vapor with entrained fibers will move through conduit 632 past open valve 652 then through conduit 639 past exit chute 628 into motor housing 680, then under the impetus of impeller 636 through conduit 638 into inlet 615. During loading, recycle is turned off by having valve 650 closed.

In operation valve 652 may be open, but is preferably closed and 650 is open. Optionally, valve 649 may be open or partially closed.

Employing matrix feed input 608 and/or 611, matrix material may be introduced directly into the fibrous material without the need of a separate mixing zone.

Separator 614 operates as a conventional cyclone. Material consisting of a mixture of vapors, particulates and fibers enters inlet 615 to cyclone 614. Within cyclone walls 641, the mixture is induced to flow in a cyclonic fashion causing the heavier components to concentrate along the walls and under the influence of gravity to fall to the bottom, where they can be removed through conduit 658 containing a valve 656. Valve 656 may be any means for opening and closing to permit the transfer of particulates and fibers through the bottom of separator 614 into conduit 658. The material consisting of a mixture of fibers dispersed in matrix material may then be transferred to a storage zone for later use or introduced directly into a processing line, such as one employing an extruder. The vapors separated from the mixture of fibers, matrix material and vapors is induced to enter outlet 642 for transfer back through conduit 639. Some of the vapors may enter filter housing 657 by first passing through a filter 646 then into conduit 648 and through valve 649 to a low pressure zone (now shown).

Other methods for inducing flow of vapor in conduit 630 may be used. Among these is one already discussed with respect to FIG. 5.

Figure 7:
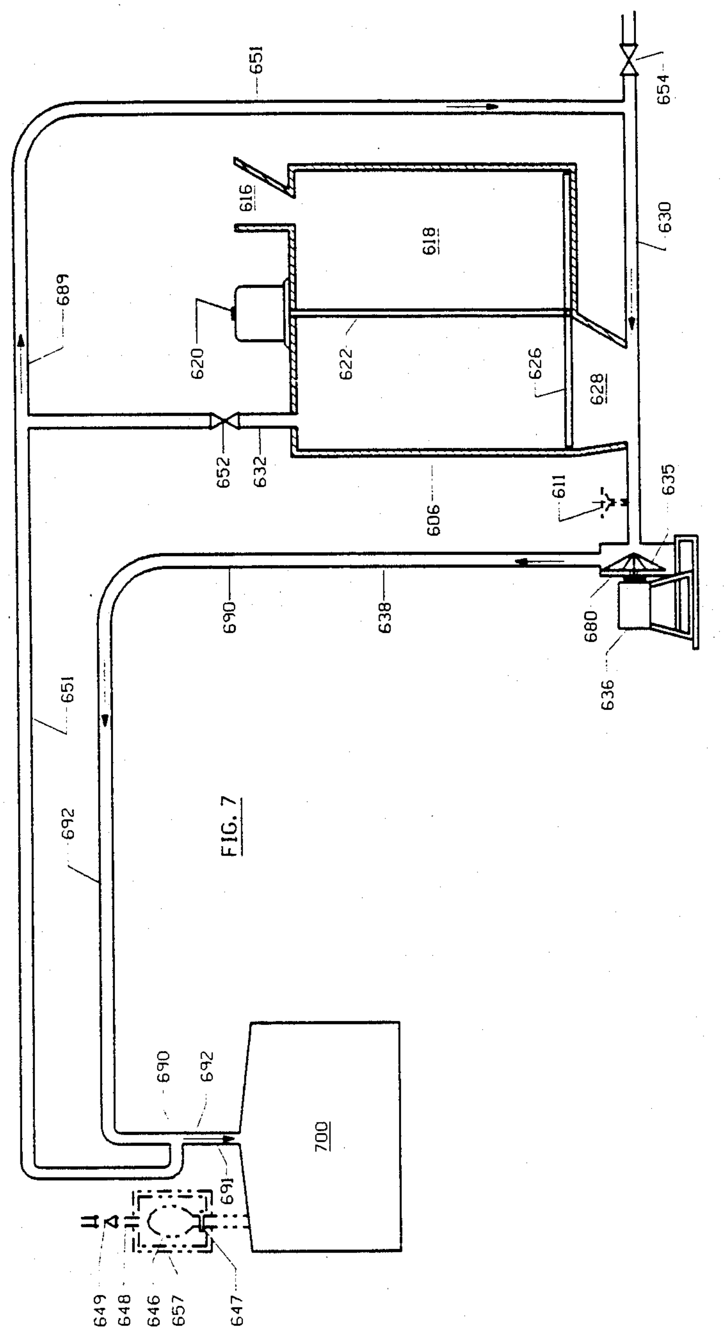
FIG. 7 is a side elevation view disclosing the improved recycle of FIG. 6 but also disclosing the use of a ballistic separation.

Referring to FIG. 7, note that like numbered elements are the same in FIGS. 6 and 7. In FIG. 7, there is disclosed an alternative separation method which may be used in addition to that shown in FIG. 6 or alone.

Briefly, the operation of the fiber fluidizer of FIG. 7 is as follows: Fiber from storage zone 618 of hopper or storage container 606 enters conduit 630 through chute 628 and is dispersed, e.g. by aspiration, into a moving stream of vapor moving in conduit 630 in the direction shown by the arrows. Matrix material may be introduced through matrix material input 611 shown in phantom outline to indicate that it is optional. Other locations for matrix material input are possible, e.g. material inputs 611 and 608 shown in phantom outline in FIG. 6.

Material entering impeller housing 680 is induced to move through conduit 638 by impeller 636. The speed of the mixture of fiber, matrix material and vapors moving through conduit 630 is in the range of about 1000 to about 6000 feet/minute. Rotation rates for impeller blades of impeller motor 636 are preferably in the range 12,000 to 25,000 revolutions per minute. Due to the inertial character of a moving body the tendency of which is to avoid changes in direction, the heavier materials or matrix material and fiber tend to continue in a straight line past the conduit takeoff point leading to conduit 651. The vapors preferentially leave ballistic separate zone 690 through conduit 651 along the direction shown by arrow 689. The particulates and fibrous material continue and enter storage zone 700. References to patents discussing how ballistic separation works are: U.S. Pat. Nos. 4,070,159 (1978); 4,066,533 (1978); 4,390,503 (1983); 4,495,063 (1985); 4,405,444 (1983); 4,374,019 (1983); and U.S. Pat. No. 4,295,961 (1981).

The fibrous and matrix material transported by conduit 692 are taken to a storage zone 700 or alternatively a cyclone separator such as disclosed in FIG. 6, or even another ballistic separator zone.

The advantage of this second embodiment is that a very simple method of separation; namely, a ballistic separation neatly fits in with a recycle system.

During loading, valve 652 is open so that entrained fibers in vapors can be drown up through conduit 632 into conduit 651. Once hopper 616 is filled and closed, for environmental reasons, then valve 652 may also be closed. Recycle vapors from conduit 651 may be fine tuned by a bleed valve 654 into conduit 630.

In summary, the process of the instant invention comprises the following steps. Firstly, fibers e.g. having a bulk density in the range of about 1 to 35 pounds per cubic foot, are passed through a pressure differential sufficient to substantially separate fibers into only loosely interacting components which are thereby entrained in a vaporous stream so as to result in a fiber entrained vaporous mixture. There is a practical limit to the bulk density determined at least in part upon the transferability of the fiber both through an opening into a conduit and then through such conduit. Also, if the bulk density is too high due to compaction from vibration or compression, a fiber can become so tightly entangled that transfer even through a turbulent pressure differential will be insufficient to disentangle them.

The process of entraining the fibers in the vapor stream can be by gravity flow and aspiration which aspiration results from movement of the vaporous fluid past an opening. An example of such a movement is flow of a vaporous fluid past the opening of chute to 28 and 628. Preferably, the movement of fiber through that opening is as a result of agitation and gravity or gravity sifting through a sieve to ensure that the fibers as they exit from the opening are in only loosely interacting condition so that they may be aspirated into and transported in a moving vapor as a result solely of the movement of the vaporous medium itself without any other energy inputs such as from example high shear stirring. The speed of the vaporous stream as it passes the opening of chute 28 or 628 is in the range of 1000 to about 6,000 feet per minute ("fpm"), more preferably in the range of about 2000 to 4000 fpm, and most preferably in the range of 2500 to 3000 fpm. The rate at which fibrous material is passed through a pressure differential is such as to result in a ratio by volume of vapor to fiber in the range of about 20,000:1 to 1,300:1, preferably in the range of about 5,000:1 to 1,500:1, and most preferably in the range of about 3,000:1 to 1,800:1.

The mixture of entrained fibers within a vapor is then transferred to a separating zone where fiber and vapors are separated into a vapor-stream with no more than 5% by weight of volume of entrained solids and a fiber-stream with at last 90% by weight of entrained solids. Examples of separation methods are: cyclonic separation, e.g. like that produced in a cyclone separator, or ballistic separation. Separated fibers may then be mixed in a separate zone into a dry or wet matrix material in such a way as to coordinate speed of mixing or agitation of the particulates with the rate of addition of the fiber stream so as to avoid any significant "balling phenomena".

Alternatively, instead of separating the fibers from a fiber-stream and then introducing them into the matrix material, we have discovered that it is possible by means of a plug flow system to introduce the matrix particulates into the entrained fluidized fiber-containing stream. "Plug flow" throughout this specification and claims means that the particulates and vapors flow through the equipment and conduit in a progressive manner without significant, e.g. greater than 10% by weight, back mixing.

Figure 10:
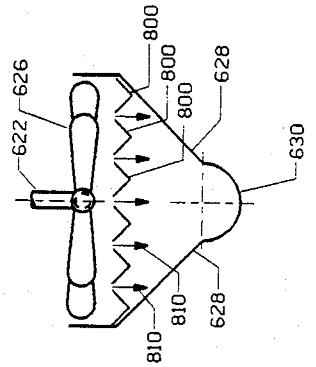
FIG. 10 is a side elevation view in cross-section along line 10—10 of FIG. 9.
Figure 9:
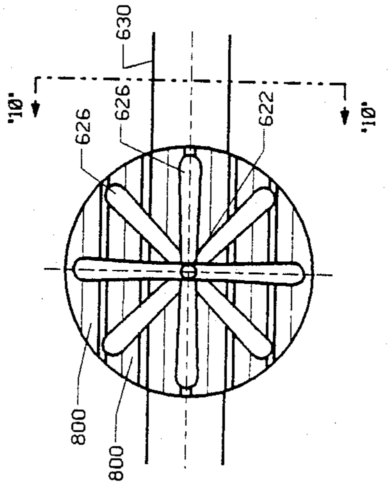
FIG. 9 is a top planar view along line 9—9 of FIG. 8.
Figure 8:
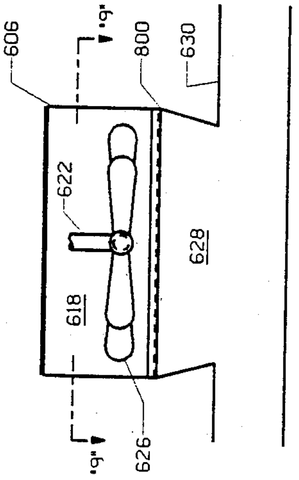
FIG. 8 discloses an alternative embodiment of storage container 606 having a novel lower section shown in a side elevation cross-sectional view.

Referring to FIGS. 8, 9 and 10, there is disclosed an alternative embodiment to storage container 606. In FIG. 8, there is a storage container 606 having a drive shaft 622, 8 stirrers 626 connected to the drive shaft 622, a series of 90° angle irons 800 spaced below rod stirrer 626 and across the bottom of container 606, and chute 628 leading to conduit 630. In FIGS. 9 and 10, angle irons 800 are shown to be disposed substantially parallel to conduit 630 with spaces between angle irons 800. Arrows 810 show the path for fibers which under the impetus of rod stirrers 628 fall between angle irons 800 into chute 628 and ultimately pass into conduit 630.

Though it is possible to have the angle irons 800 at a variety of angles relative to the longitudinal axis of conduit 630, we believe it preferable to have the angle irons 800 substantially parallel to conduit 630.

In this alternate embodiment shown in FIGS. 8, 9 and 10, the total bottom of storage container 606 is open. Having angle irons 800 with their pointed side directed downward helps avoid ridging that might otherwise occur. The space between angle irons 800 increase as one moves downwardly between angle irons 800.

We have found that the rate of feeding through the grating consisting of an array of angle irons 800 as shown in FIGS. 8, 9 and 10 can be very accurately controlled depending upon the rate of revolutions per minute of stirrer rods 626. For example, carbon fibers having an average length of 300 microns, an average diameter in the range of 10 to 20 microns, and an intrinsic density of fiber of about 1.6 will in an uncompacted state from storage zone 618 feed into conduit 630 at a rate of about 0.35 pounds/minute/square inch of open space when stirrer rods 626 rotate at six revolutions per minute. Stirrer rods are roughly a ½" in diameter. They are cylindrical and they reach to within ½" of the walls of storage container 606. They are spaced above angle irons 800 by about ⅜" inches. Angle irons 800 are at 90° and each side of the angle iron is roughly ¾". The spacing between angle irons is roughly ¼ of an inch.

EXAMPLES

Example 1

This example is directed to the steps usually taken in the formation of brake pads. The example sets forth typical kinds of resins and the steps taken in adding asbestos fibers to a resin which is then molded and machined form brake pads.

A brake lining converts kinetic energy into heat and then dissipates it to the surrounding equipment and environment. Brake linings are usually made of a resin matrix containing other components and a plethora of additives. The components and additives may include asbestos fibers, sulfur, zinc oxide, barytes, steel wool, graphite, metal fibers, zinc dust, iron oxide and rottenstone. Asbestos is used as major component because of its good thermal stability, low cost, high friction and good reinforcing properties. A typical pad comprises, in weight percent of total pad weight: 22% acrylonitrile/-butadiene copolymer, 49% asbestos, 2% sulfur, 11.5% barytes, and 11.5% rottenstone. Blending of the components and additives involves charging to a Littleford mixer where they are stirred together. The blended mix is then formed into briquettes hot pressured at 160° to 180° C. for 5 to 15 minutes to form brake pads. The pads are then baked at 220° to 300° C. for 4 to 8 hours. These baked pads are then drilled and ground to tolerances to make the finished brake pad.

Sometimes synthetic resins such as phenolics or cresylic resins are used usually modified with drying oils, rubber, and epoxies.

The particle size of the synthetic resin in spherical equivalents is preferably in the range of about 0.1 to 250 microns and more preferably in the range of about 1 to 100 microns.

Example 2

In this example there is a discussion of the apparatus, and the carbon fibers used to prepare brake pads using a dry blender. The key point of this example is that no matter how well dispersed the carbon fibers are prior to addition to the mixer if they are added as an unfluidized collection of fibers, e.g. as a cluster of fibers, then the balling phenomena occurs.

A typical batch of brake pad mixture would be made by weighing and charging the weighed components into a Littleford dry mixer. The mixing equipment typically is a Littleford Brothers mixer which is a horizontal cylinder. Inside this horizontal cylinder, a series of plows turn around inside the circumferential surface and there is a high shear chopper entering from the lower side at a 45 degree angle. After each of the components have been charged to the unit, both the plows and the chopper are turned on for about 5 minutes which thoroughly mixes the dry components into a homogenous mix, except when an amorphous Ashland carbon fiber is included. Carbon fibers have a propensity to form balls and not disperse. The reason for the balling is thought to be caused by the uniformity of the particles, the roughness of the surface, and the stiffness of the fiber. Since the particles are subject to static charge, this phenomenon may play a part in the initial cohesiveness of the carbon fibers particles. When the carbon fiber balls form in the mix, the blend is unusable. When processed into brake pads, it shows as discernible spots on the wearing face. This causes 2 problems, the fibers are not arranged to give maximum strength and the "spots" are harder and more abrasive than the surrounding matrix. These hard spots cause grooves to be worn in mating surfaces.

Example 3

This example will disclose that if a fluidizing step is employed, then carbon fiber spheres do not appear in the finished brake pads.

This description shows how the carbon fibers are added to the brake mix to avoid the balling of the carbon fibers. All other components are added to the Littleford mixer. The carbon fiber portion of the mix is added to the storage hopper of the fiber fluidizer with the impeller fan running. During the charging, the bottom valve is closed. The primary reason for this configuration is to reduce the amount of dust emanating from the hopper during the carbon fiber charging. With both the plow-like agitator and the high-speed chopper running in the Littleford mixer, the storage hopper agitator is started and the valve on the bottom of the storage hopper is opened sufficiently to establish the correct addition rate. The bottom rod sweep on the hopper agitator carries the fiber over the pie-shaped opening where it falls into a chute. This opening doesn't necessarily have to be pie-shaped. Any opening that will allow the fiber to fall through will suffice. This opening could be a sieve or screen. The carbon fiber falling through the chute contacts the moving air stream where it mixes with the air and is carried through an impeller fan. The fluidized carbon fiber is then carried to a separator (cyclone) mounted on the Littleford mixer. The cyclone doesn't have a cone shaped bottom, but is straight sided. The carbon has a tendency to bridge and, if the angle of the sides is insufficiently includes, the fiber will clog the outlet. The fiber drops out of the cyclone into the agitated brake pad mix in more or less individual fibers. These fibers are coated and mixed with the other components before they are able to agglomerate into balls or clumps. After all of the fibers have been blown in, the mix is agitated for a few minutes, the agitators are shutdown and the brake mix is discharged through the solids outlet in the bottom of the mixer. The fluidizing air plus the air necessary for bearing purge is exhausted through the tube in the cyclone then into a filter sock to retain particulates of dust, and/or brake mix components.

In place of the motor driven fan, an eductor as shown in FIG. 5 may be used. The eductor uses a motive fluid of air to cause a low pressure area which sucks in fiber and air. This fluidized fiber is then conveyed to the mixer in much the same manner as with the fan.

"Equivalent spherical diameter" for a particular particle as used through the Specification and Claims means that diameter a spherical particle would have to have the same surface to volume ratio as the particular particle in question.

Reference to patents made in the Specification is intended to result in such patents being expressly incorporated herein by reference including any patents or other literature references cited within such patents.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein. For example, instead of a pie-shaped opening, other shapes are possible. We have found that a circular opening having a sieve through which fiber must pass can also work. Preferably, the sieve has openings in the range of about 10 to about 2,000 microns and will vary somewhat depending upon median fiber dimensions. As another example, commercially available wedge wire screen or rods can be used in place of angle irons 800.

What is claimed is:

1. A process for avoiding clumping of fibers during preparation of a mixture of said fibers and particulates comprising:

A. passing fibers with a vaporous medium through a turbulent pressure differential in the range of about 10 to about 35 inches of water as a pressure head to form a fiber-entrained-vapor-mixture flowing at a speed sufficient to permit transfer as a fluid in a conduit and having a ratio by volume of vapor to fiber in the range of about 1,300:1 to about 20,000:1;

B. separating said fiber-entrained-vapor-mixture into a vapor-stream and a fiber-containing stream providing, based upon total weight of solids in said fiber-entrained-vapor-mixture, a recovery of at least 90% by weight of solids;

C. mixing said fiber-containing stream into said particulates to form a fiber-particulate mixture; wherein rate of addition and agitation are so coordinated that clumping of said fibers is substantially avoided.

2. The process of claim 1, wherein said vapor-stream has, as based on total weight of said vapor-stream, no more than 5% by weight of entrained solids.

3. The process of claim 1, wherein said fiber-entrained-vapor-mixture contains, as based on the total weight of both solids and vapor, from about 10% by weight to 50% by weight of solids.

4. The process of claim 1, wherein said fibers of (A) have a bulk density in the range of about one pound per cubic foot to 35 pounds per cubic foot.

5. The process of claim 1, wherein said fibers have diameters in the range of about 5 to 30 microns and a length in the range of about 50 microns to about one-half inch.

6. The process of claim 1, wherein said particulates have an equivalent spherical diameter in the range of about 0.1 to about 250 microns.

7. The process of claim 1, wherein the ratio by weight of fiber to particulates in said fiber-particulate mixture is in the range of about 100:1 to 1:100.

8. The process of claim 1, wherein said fiber-containing stream has a ratio by volume of vapor to solids in the range of about 5,000:1 to about 1,500:1.

9. The process of claim 1, wherein said speed sufficient to permit transfer as a fluid in a conduit is at least 1,000 feet/minute.

10. The process of claim 1, wherein at least a portion of said vapor-stream is recycled so as to become part of said fiber-entrained-vapor-mixture.

11. Process of claim 10, wherein the percent by weight of solids in said portion of said vapor-stream which is recycled is not more than 0.1% by weight of entrained solids, as based upon the total weight of solids in said fiber-entrained-vapor-mixture.

12. A process for avoiding clumping of fibers during preparation of a mixture of said fibers and particulates, comprising:

A. passing said fibers and a vaporous medium through a turbulent pressure differential in the range of about 10 to about 35 inches of water as a pressure head to form an entrained-fiber-vapor-mixture having a ratio by volume of vapor to fiber in the range of about 1,300:1 to 20,000:1.

B. introducing particulates into said entrained-fiber-vapor-mixture to form a fiber-particulate-containing stream; and C. separating said fiber-particulate-containing stream into a vapor-stream, and a solids-containing stream having at least 90% by weight of solids, as based on the total weight of solids in said fiber-particulate-containing stream.

13. The process of claim 12, wherein said vapor-stream has, as based on the total weight of solids in said fiber-particulate-containing stream, no more than 5% by weight of solids.

14. The process of claim 12, wherein at least a portion of said vapor-stream is recycled so as to become part of said fiber-particulate-containing-stream.

15. The process of claim 14, wherein the percent by volume of said at least a portion of said vapor-stream that is recycled, as based on the total volume of said vapor-stream of C., is in the range of about 10 to about 90 percent by volume.

16. The process of claim 12, wherein said fibers to be passed through said turbulent pressure differential have a bulk density in the range of about one pound per cubic foot to 35 pounds per cubic foot.

17. The process of claim 12, wherein said fibers have diameters in the range of about 5 to 30 microns and a length in the range of about 50 microns to about one-half inch.

18. The process of claim 12, wherein said particulates introduced into said entrained-fiber-vapor-mixture has an equivalent spherical diameter in the range of about 0.1 to about 250 microns.

19. The process of claim 12, wherein said solids-containing stream has a ratio by weight of particulates to fiber in the range of about 100:1 to 1:100.

20. A process for uniformly dispersing a fiber into particulate comprising:

A. introducing said particulates into a vaporous stream to form particulate-entrained-vapor-mixture;

B. introducing fiber into said particulate-entrained-vapor-mixture to form a particulate-and-fiber-containing mixture; and C. separating said particulate-and-fiber-containing mixture into a vapor-stream and a solids-containing stream having, as based on the total weight of solids and vapor in said solids-containing stream, at least 90% by weight of solids in the form of fibers or particulates to form a mixture of fibers uniformly dispersed among said particulates.

21. The process of claim 20, wherein said vapor-stream has, as based on the total weight of said vapor-stream, no more than 5% by weight of solids.

22. The process of claim 20, wherein said particulate-and-fiber-containing mixture has a ratio by volume of vapor to solids in the range of about 1,300:1 to about 20,000:1.

23. The process of claim 20, wherein said fiber introduced into said particulate-entrained-vapor-mixture has a diameter in the range of about 5 to 30 microns and lengths in the range of about 50 microns to one-half inch.

24. The process of claim 20, wherein said particulates introduced into said vaporous stream has an equivalent spherical diameter in the range of about 0.1 to about 250 microns.

25. The process of claim 20, wherein said mixture of fibers uniformly dispersed among said particulates has a weight ratio of fiber to particulates in the range of about 100:1 to 1:100.

26. The process of claim 20, wherein said introducing fiber into said particulate-entrained-vapor-mixture comprises passing said fiber and said particulate-entrained-vapor-mixture through a turbulent pressure differential in the range of about 10 to about 35 inches of water as a pressure head to form said particulate-and-fiber-containing mixture.

27. The process of claim 20, wherein at least a portion of said vapor-stream is recycled so as to become part of said particulate-and-fiber-containing-mixture.

28. The process of claim 27, wherein percent by volume of said at least a portion of said vapor-stream that is recycled, as based on the total volume of said vapor-stream, is in the range of about 10% to about 90%.

29. The process of claim 20, wherein said vaporous stream is moving at a speed sufficient to permit transfer of said particulates in said particulate-entrained-vapor-mixture as a fluid in a conduit.

30. An apparatus for dispersing fibers in particulates comprising:

a pressure means for producing, in a vaporous fluid containing a material selected from the group consisting of fiber or particulates, a turbulent pressure differential of about 10 to 35 inches of water as a pressure head to form an entrained-fiber-vapor-stream that moves with a speed of at least 1000 feet per minute, said pressure means having a fiber-inlet, a vapor-inlet and an entrained-fiber-and vapor-stream-outlet;

a transferring means for transferring said entrained-fiber-vapor stream having an entrained-fiber-and-vapor-inlet and an entrained-fiber-and-vapor-outlet;

a separation means having a solid-containing-stream-outlet, a vapor-containing-stream-outlet, and an entrained-fiber-and-vapor-inlet for separating a solid-vapor mixture into a solid-containing-stream and a vapor-stream, which at least in part exit through said solid-containing-stream-outlet and said vapor-containing-stream-outlet, respectively; and a mixing means for mixing two solids having a fiber-containing-stream-inlet; Wherein said entrained-fiber-and-vapor-stream-outlet of said pressure means is in fluid communication with said entrained-fiber-and-vapor-inlet of said transferring means and said entrained-fiber-and-vapor-outlet of said transferring means is in fluid communication with said entrained-fiber-and-vapor-inlet of said separation means and said solid-containing-stream-outlet of said separation means is in fluid communication with said fiber-containing-stream-inlet of said mixing means.

31. An Apparatus for dispersing fibers in particulates comprising:

A. a pressure means for producing, in a vaporous fluid containing a material selected from the group consisting of fiber or particulates, a turbulent pressure differential of about 10 to 35 inches of water as a pressure head to form an entrained-fiber vapor-stream that at least in part as a result of passing through said turbulent pressure differential will move with a speed sufficient to permit transfer as a fluid in a conduit, which pressure means has a fiber-inlet, a vapor-inlet, and an entrained-fiber-and-vapor-stream outlet through which said entrained-fiber-vapor-stream at least in part flowing;

B. a transferring means for transferring said entrained-fiber-vapor-stream having an entrained-fiber-and-vapor-inlet, and an entrained-fiber-and-vapor-outlet;

C. a particulate input means having a particulate-stream-outlet for introducing said particulates into said pressure means along with said vaporous fluid to form an entrained-fiber-and-vapor-stream; and D. a separation means having a solid-containing-stream-outlet, a vapor-containing-stream-outlet, and an entrained-fiber-and-vapor-inlet for separating said entrained-fiber-and-vapor-inlet for separating said entrained-fiber-and-vapor-stream into a solid-containing-stream and a vapor-stream which at least in part exits through said solid-containing-stream-outlet and said vapor-containing-stream-outlet, respectively;

wherein said entrained-fiber-and-vapor-stream-outlet of said pressure means is in fluid communication with said entrained-fiber-and-vapor-inlet of said transferring means, and said entrained-fiber-and-vapor-outlet of said transferring means is in fluid communication with said entrained-fiber-and-vapor-inlet of said separation means, and said particulate-stream-outlet of said particulate input means is in fluid communication with an inlet selected from one or more of the following group of inlets consisting of: said fiber-inlet of said pressure means; and vapor-inlet of said pressure means; said entrained-fiber-and-vapor-inlet of said transferring means; and said entrained-fiber-and-vapor-inlet of said separation means, and said solid-containing-stream-outlet of said separation means is adaptable for connection to a container.

32. The apparatus of claim 31, wherein there is additionally a recycle means for transferring through fluid communication at least a portion of said vapor-stream produced as a result of separation of said solid-vapor mixture by said separation means so as to become part of said entrained-fiber-vapor-stream.

33. The apparatus of claim 31, wherein there is additionally a recycle means for transferring through fluid communication at least a portion of said vapor-stream produced as a result of separation of said solid-vapor mixture by said separation means so as to become part of at least one of said fiber, said vapor, or said particles stream that enter said pressure means.

34. The apparatus of claim 30, wherein said separation means is a ballistic separator.

35. The apparatus of claim 30, wherein said separation means is a cyclone separator.

36. The apparatus of claim 30, wherein there is additionally a recycle means for reintroducing at least a portion of said vapor-stream separated by said separation means back into said entrained-fiber-vapor-stream.

37. The apparatus of claim 36, wherein said recycle means is adapted for transfers through fluid communication at least a portion of said vapor-stream produced by said separation means into that material selected from the group consisting of vapor or particulates that enter said pressure means at least partially upstream of said turbulent pressure differential.

38. The apparatus of claim 36, wherein said recycle means is adapted to transfer by fluid communication said at least a portion of said vapor-stream produced by said separation means into that material selected from the group consisting of vapor or particulates that enter said pressure means substantially totally upstream of said turbulent pressure differential.

39. The apparatus of claim 31, wherein said speed sufficient to permit transfer as a fluid in a conduit is at least 1,000 feet per minute.

40. The apparatus of claim 31, wherein the pressure differential increases in going from upstream to downstream, as determined by direction of flow of material.

* * * * *